(12) United States Patent
Singh et al.

(10) Patent No.: US 12,010,142 B2
(45) Date of Patent: Jun. 11, 2024

(54) PHISHING MAIL GENERATOR WITH ADAPTIVE COMPLEXITY USING GENERATIVE ADVERSARIAL NETWORK

(71) Applicant: MASTERCARD INTERNATIONAL INCORPORATED, Purchase, NY (US)

(72) Inventors: Alok Singh, Ghaziabad (IN); Nitish Kumar, Jamshedpur (IN); Kanishka Kayathwal, Kota (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 358 days.

(21) Appl. No.: 17/469,009

(22) Filed: Sep. 8, 2021

(65) Prior Publication Data
US 2023/0075964 A1  Mar. 9, 2023

(51) Int. Cl.
| | |
|---|---|
| *H04L 9/40* | (2022.01) |
| *G06N 3/02* | (2006.01) |
| *G06N 3/044* | (2023.01) |
| *G06N 3/045* | (2023.01) |
| *G06N 3/088* | (2023.01) |

(52) U.S. Cl.
CPC ......... *H04L 63/1483* (2013.01); *G06N 3/044* (2023.01); *G06N 3/045* (2023.01); *G06N 3/088* (2013.01)

(58) Field of Classification Search
CPC . H04L 63/1483; H04L 63/1466; G06N 3/045; G06N 3/044; G06N 3/088
See application file for complete search history.

(56) References Cited

U.S. PATENT DOCUMENTS

| | | | |
|---|---|---|---|
| 10,623,362 B1* | 4/2020 | Hills | H04L 51/216 |
| 11,277,430 B2* | 3/2022 | Vela | H04L 63/1416 |
| 11,310,270 B1* | 4/2022 | Weber | H04L 63/1425 |
| 11,509,683 B2* | 11/2022 | Vela | H04L 63/1466 |
| 11,509,689 B2* | 11/2022 | Weber | H04L 63/1483 |
| 11,595,435 B2* | 2/2023 | Singh | G06Q 10/107 |
| 11,700,266 B2* | 7/2023 | Silverstein | H04L 63/1408 726/1 |
| 2022/0094702 A1* | 3/2022 | Saad Ahmed | H04L 63/1416 |

* cited by examiner

*Primary Examiner* — Hosuk Song
(74) *Attorney, Agent, or Firm* — LOZA & LOZA, LLP

(57) ABSTRACT

A generative adversarial network and a reinforcement learning system are combined to generate phishing emails with adaptive complexity. A plurality of phishing emails are obtained from a trained generative adversarial neural network, including a generator neural network and a discriminator neural network. A subset of phishing emails is selected, from the plurality of phishing emails, using a reinforcement learning system trained on user-specific behavior. One or more of the subset of phishing emails are sent to a user email account associated with a particular user. The reinforcement learning system is then adjusted based on user action feedback to the one or more of the subset of phishing emails.

20 Claims, 12 Drawing Sheets

PHISHING MAIL GENERATOR WITH ADAPTIVE COMPLEXITY USING GENERATIVE ADVERSARIAL NETWORK

TECHNICAL FIELD

The technology discussed below relates generally to phishing attack detection techniques, and more particularly, to methods for artificially generating phishing mails that can serve to train individuals to identify and avoid phishing mails.

INTRODUCTION

Phishing attacks often involve sending a message, typically in the form of an electronic mail (e-mail), to an individual (e.g., a person, an employee of a company, a user of a computing device) directing the individual to perform an action, such as opening an e-mail attachment or selecting an embedded link. Such action would typically carry little risk if such message were from a trusted source (e.g., co-worker, bank, utility company). However, in a phishing attack, such message is from an attacker (e.g., an individual using a computing device to perform a malicious act on another computer device user) disguised as a trusted source. Thus, the unsuspecting individual that opens the attachment may, unknowingly and/or unintentionally, install malicious software (i.e., a virus, spyware, and/or other malware) on his/her computer. Similarly, an unsuspecting individual may be persuaded to access a link to a webpage made to look like an authentic login or authentication webpage, but may in fact be deceived into submitting his/her username, password or other sensitive information to an attacker.

Software programs have been designed to detect and block phishing emails, but phishing attacks methods are frequently modified by attackers to evade such forms of detection. One of the best forms of inhibiting such phishing attacks is to be able to educate users to identify a phishing email and ignore or avoid it. However, a challenge exists in providing such user education about phishing attacks without exposing them to real phishing attacks.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide a method, software, and/or a device for generating phishing electronic mail (email) while providing adaptive complexity. This method may be used, for example, to train individuals, employees, and/or a group of individuals to identify phishing emails.

A plurality of phishing emails may be obtained from a trained generative adversarial neural network, including a generator neural network and a discriminator neural network. According to one aspect, the trained generative adversarial neural network may be trained using real phishing emails and generated phishing emails until the discriminator neural network is unable to identify a threshold percentage of the generated phishing emails as fake phishing emails. The plurality of phishing emails may be generated by the generator neural network after the generative adversarial neural network is trained.

A subset of phishing emails is then selected, from the plurality of phishing emails, using a reinforcement learning system trained on user-specific behavior. The subset of phishing emails may be selected based on the likelihood that the particular user will take action on one or more of the subset of phishing emails. In one example, the reinforcement learning system may be a bidirectional long short term memory (LSTM) recurrent neural network (RNN). The reinforcement learning system may have a retained memory of n previous time steps or phishing emails for the particular user. In various examples, the user-specific behavior may include at least one of: (a) web browsing history for the particular user, (b) past user behavior in identifying phishing, and/or (c) phishing email features to which the particular user has been responsive in the past.

One or more of the subset of phishing emails is sent to a user email account associated with a particular user.

The reinforcement learning system may be adjusted based on user action feedback to the one or more of the subset of phishing emails. After adjusting the reinforcement learning system, another subset of phishing emails may be selected, from the plurality of phishing emails, using the reinforcement learning system trained on user-specific behavior. One or more of the another subset of phishing emails may then be sent to the user email account associated with the particular user.

In various examples, the user action may include at least one of: (a) selecting a link in one or more of the subset of phishing emails sent to the user email account, (b) opening a file attached to the one or more of the subset of phishing emails sent to the user email account, and/or (c) replying to one or more of the subset of phishing emails sent to the user email account.

Additionally, when user action is taken in one or more of the subset of phishing emails, the particular user may be notified that it was a phishing email.

This method may be incorporated as part of a training system for a plurality of individuals or users. The reinforcement learning system may thus select another subset of phishing emails, from the plurality of phishing emails, using the reinforcement learning system trained on a different user-specific behavior. One or more of the another subset of phishing emails may be sent to another user email account associated with another user. The reinforcement learning system (or a portion thereof) may be adjusted based on user action feedback to the one or more of the another subset of phishing emails. The reinforcement learning system may be configured to maintain distinct classification models and/or neural networks for each user in order to serve/train a plurality of users.

In one example of the reinforcement learning system, user-specific behavior may be classified for the particular user. A likelihood or probability that the particular user will select each of the plurality of phishing emails may be evaluated based on the classification of the user-specific behavior. A subset of phishing emails may then be selected based on the evaluation, where the subset of phishing emails is selected based on having the highest likelihood of triggering action by the particular user.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Phishing is global problem that poses a significant threat to data security. Phishing attacks are email scams that use deception and social engineering to bait or deceive individuals (e.g., company employees, etc.) into providing sensitive business information (e.g., login credentials, bank details, etc.). In an attempt to protect these individuals from phishing email, companies are providing extensive training to their employees to identify a potential phishing email.

A tool is herein provided that generates phishing emails that can serve to train users or individuals (e.g., company employees) to identify phishing emails and also adapts the phishing emails based on the user's behavior over time. A generative adversarial network, comprising a phishing email generator neural network and a discriminator neural network, may be trained to provide a pool/plurality of phishing emails. A reinforcement learning neural network or algorithm may be adapted to evaluate the pool of phishing emails and select those most likely to cause the user to take action (e.g., select a link or open a file in the phishing email). User action is fed back to the reinforcement learning neural network or algorithm so that it can be adjusted over time as the user learn to discern phishing emails.

Figure 1:
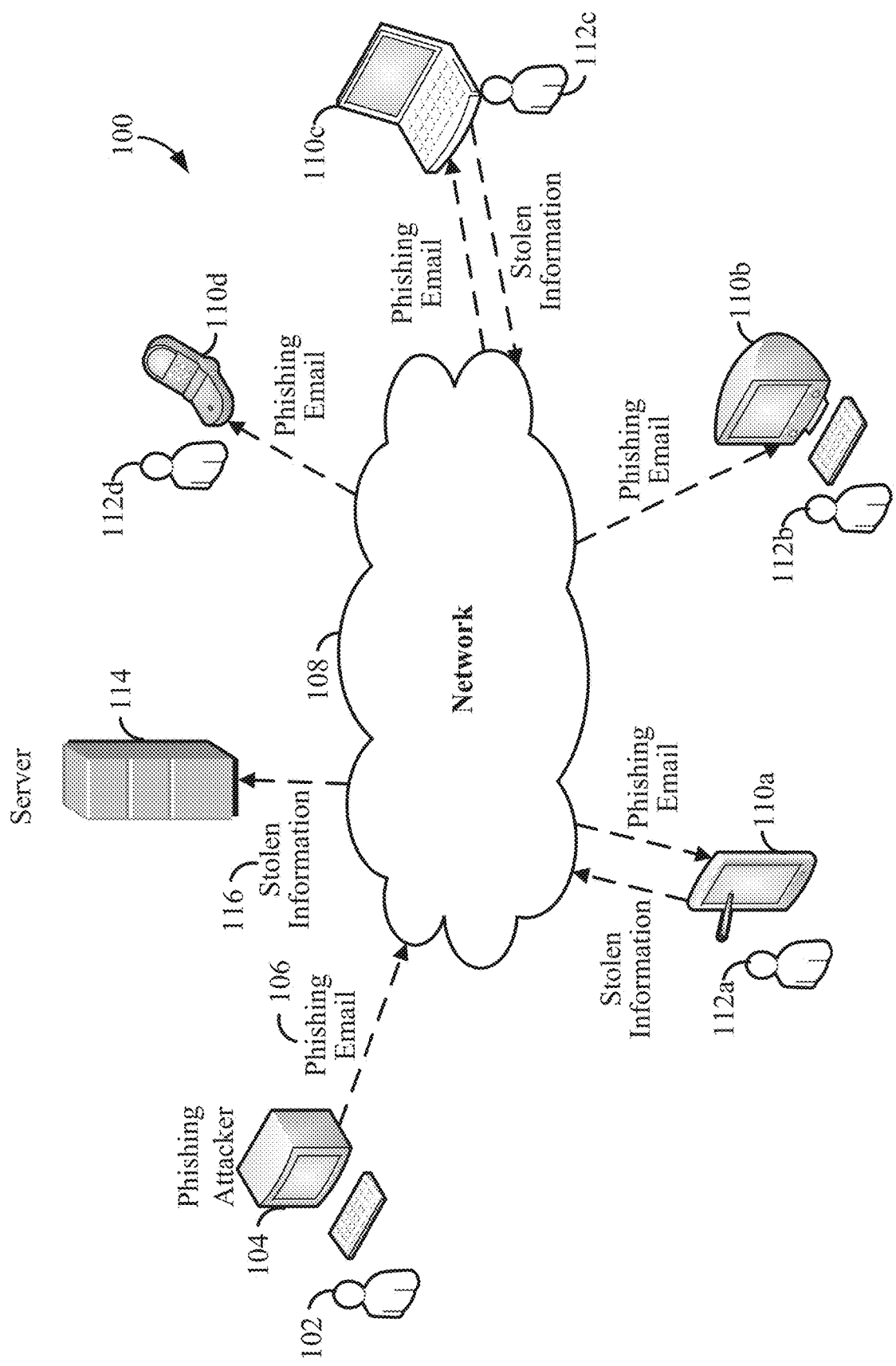
FIG. 1 is a diagram illustrating an exemplary operating environment in which phishing attacks may occur.

FIG. 1 is a diagram illustrating an exemplary operating environment 100 in which phishing attacks may occur. An attacker 102 may use a computing device 104 to generate and send a phishing email 106 over a network to one or more electronic devices 110 (e.g., computers, phones, tablets, etc.) operated by one or more users or individuals 112. The phishing email 106 may be worded to deceive the recipient users or individuals 112 into believing that the email is legitimate (e.g., sent by someone they know or pertaining to a personal matter, etc.). Note that the terms "mail", and/or "email" may be interchangeably used herein to refer to electronic mail.

In one example, the phishing email may include an attached file that, when opened by the recipient users or individuals 112, attempts to install a virus, malware, or spyware software on the computing device 104 to access private information (e.g., bank account information, user names and passwords, etc.). This stolen information 116 may be sent by the virus, malware, or spyware software to a server 114 where it may be sold or misused (e.g., to access a bank account, withdraw funds, etc.) by the attacker to perform unauthorized transactions.

In another example, the phishing email may include a link to a website that, when the link is selected by the recipient users or individuals 112, opens a website (e.g., a fake bank website, etc.) that attempts to deceive the user into providing private information (e.g., access to bank account, credit card, etc.). The website may be operated on the server 114 which allows an attacker to siphon the provided private information to perform unauthorized transactions.

In most cases, these phishing attacks require some action by the recipient users or individuals 112, such as opening a file or selecting a website link. According to one aspect, one way to reduce or inhibit the instances of a successful phishing attack may be to properly train the users or individuals 112 to recognize a phishing email in order to avoid triggering the phishing attack. However, in order to provide such proper training, an efficient method is needed to generate artificial phishing emails that appear as realistic emails to the recipient users or individuals.

According to one feature, a software tool is provided that can assist in training individuals (e.g., company employees or workers) in identifying and avoiding phishing emails. The software tool may be configured to engineer a personalized phishing mail, e.g., for each individual or group of individual, with adaptive complexity to provide comprehensive training. In one aspect, adaptive complexity of the phishing emails is provided to the end-user individual(s) based on their action in identifying phishing emails. State of the art artificial intelligence techniques, such as generative adversarial networks along with reinforcement learning, may be leveraged to generate the phishing emails.

Figure 2:
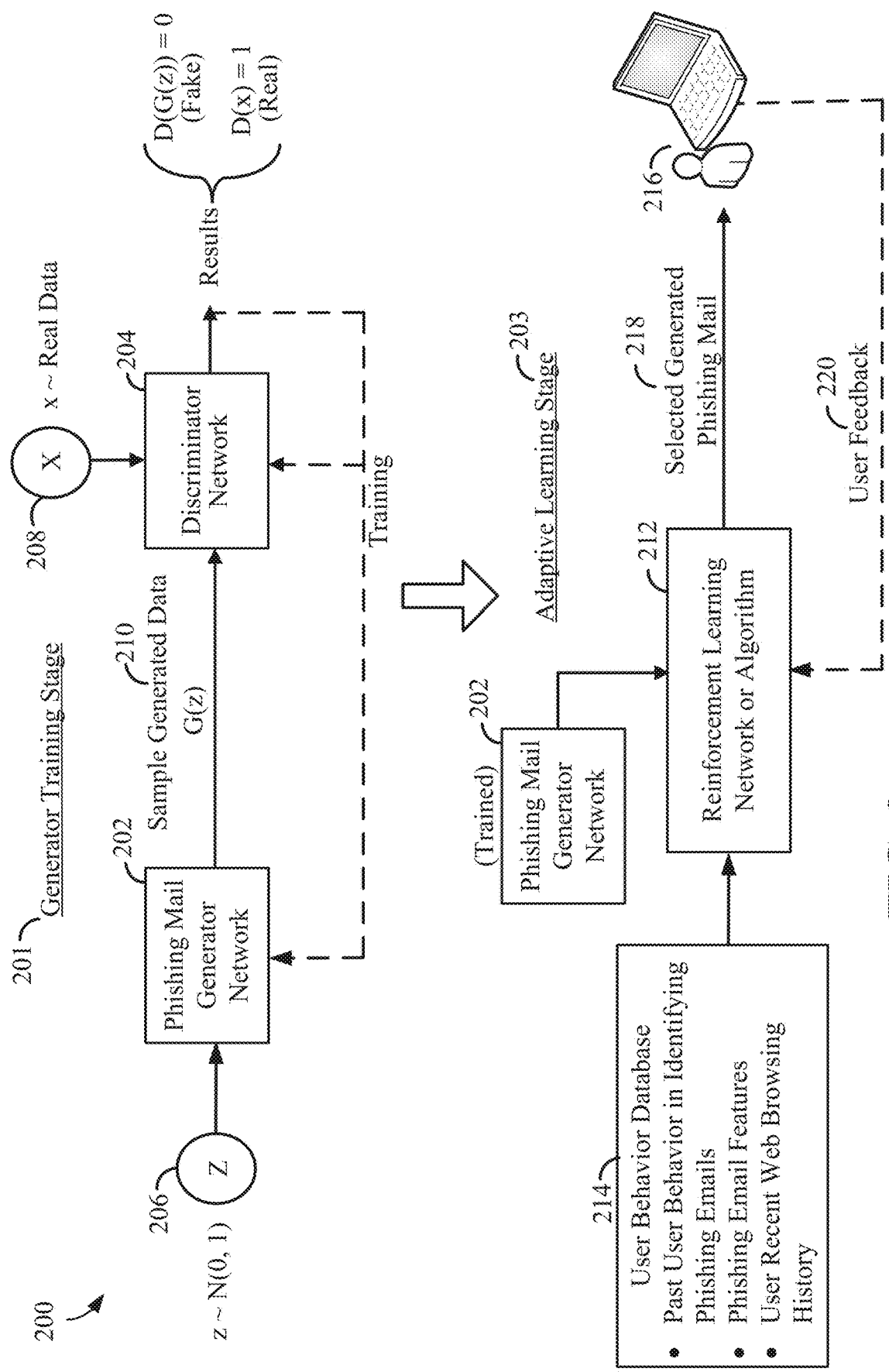
FIG. 2 is a block diagram illustrating one example of a phishing email generator system with adaptive complexity for incremental and holistic learning of individuals to identify phishing mail.

FIG. 2 is a block diagram illustrating one example of a phishing email generator system with adaptive complexity for incremental and holistic learning of individuals to identify phishing mail. For purposes of illustration, this system is shown as a generator training stage 201 and an adaptive learning stage 230. In one example, the phishing email generator system may be implemented as a neural network, for instance, having a framework of a convolutional generative adversarial network (GANs) 200. It is contemplated that various different neural network models and/or frameworks may be used to implement the phishing email generator system 200. Thus, the example described herein should not be construed as limiting.

In this example, the GANs 200 may include two competing neural networks, a generator network 202 and a discriminator network 204, that compete with each other to achieve their individual goals. The generator network 202 is configured to learn trends in a distribution of given data (e.g., set of words, sentences, phrases, etc.) and use a data set 206 to generate sample phishing emails that closely resemble real phishing emails (e.g., emails intended to deceive a recipient into performing some act). In various examples, the input data set 206 used by the generator network 202 may be a set of letters, numbers, and/or symbols, or it may be a set of words and/or phrases. One example of the generator network 202 is predicting the next word in a sentence given a previous word. The goal of the generator network 202 may be to generate a phishing email that appears realistic to the discriminator (and potential recipients). Thus, the generator network 202 may seek to form sentences and/or phrases that read as real phishing emails. Additionally, in some aspect, the generator network 202 may also seek to generate or select hyperlinks (e.g., to websites) and/or files for attachment to the phishing email.

The discriminator network 204 is configured to classify the phishing emails. For instance, the discriminator network 204 may decide whether a phishing email is fake/generated (i.e., by the generator network) or taken from a real sample 208 using a binary classification problem with the help of a sigmoid function that gives an output in the range of 0 to 1. That is, the discriminator network 204 outputs a probability of whether the evaluated phishing email (provided as its input) is perceived (by the discriminator network 204) as real or fake/generated (e.g., 100%=real phishing email, 0%=fake phishing email).

In an initial training phase, the discriminator network 204 may be trained by using only real data 208 (e.g., real phishing emails) to determine if it can evaluate such real data 208 correctly (i.e., generate an output of 1). The same training process may be performed using the generated data 210 to determine if the discriminator network 204 can correctly classify such generated data 210 as fake data (i.e., generate an output of 0). During this initial training phase, the generator network 202 is frozen (i.e., not adjusted based on the discriminator network results). The discriminator network 204 may include weights and/or parameters that are updated or adjusted so that real data 208 (i.e., real phishing emails) produces an output of 1 (or 100%) and generated/fake data 210 produces an output of 0 or (0%).

Next, in a second training phase, the generator network 202 may be trained with the results provided by the discriminator network 204 during the initial training phase. During this initial training phase, the discriminator network 204 may be frozen (e.g., not adjusted based on the generator network 202 results). The generator network 202 is trained to try to produce generated data 210 (e.g., phishing emails) that will deceive the discriminator network 204 into believing that the generated data 210 is real data 208. The generator network 202 may include weights and/or parameters that are updated or adjusted so the discriminator network 204 perceives the generated data 208 as real data at least some of the time.

This training process may continue, by alternating between training the generator network 202 and training the discriminator network 204, until the discriminator network 204 evaluates a desired threshold percentage (e.g., 50%, 60%, 70%, 80%, etc.) of the generated data 210 (e.g., phishing emails) as "real".

Figure 3:
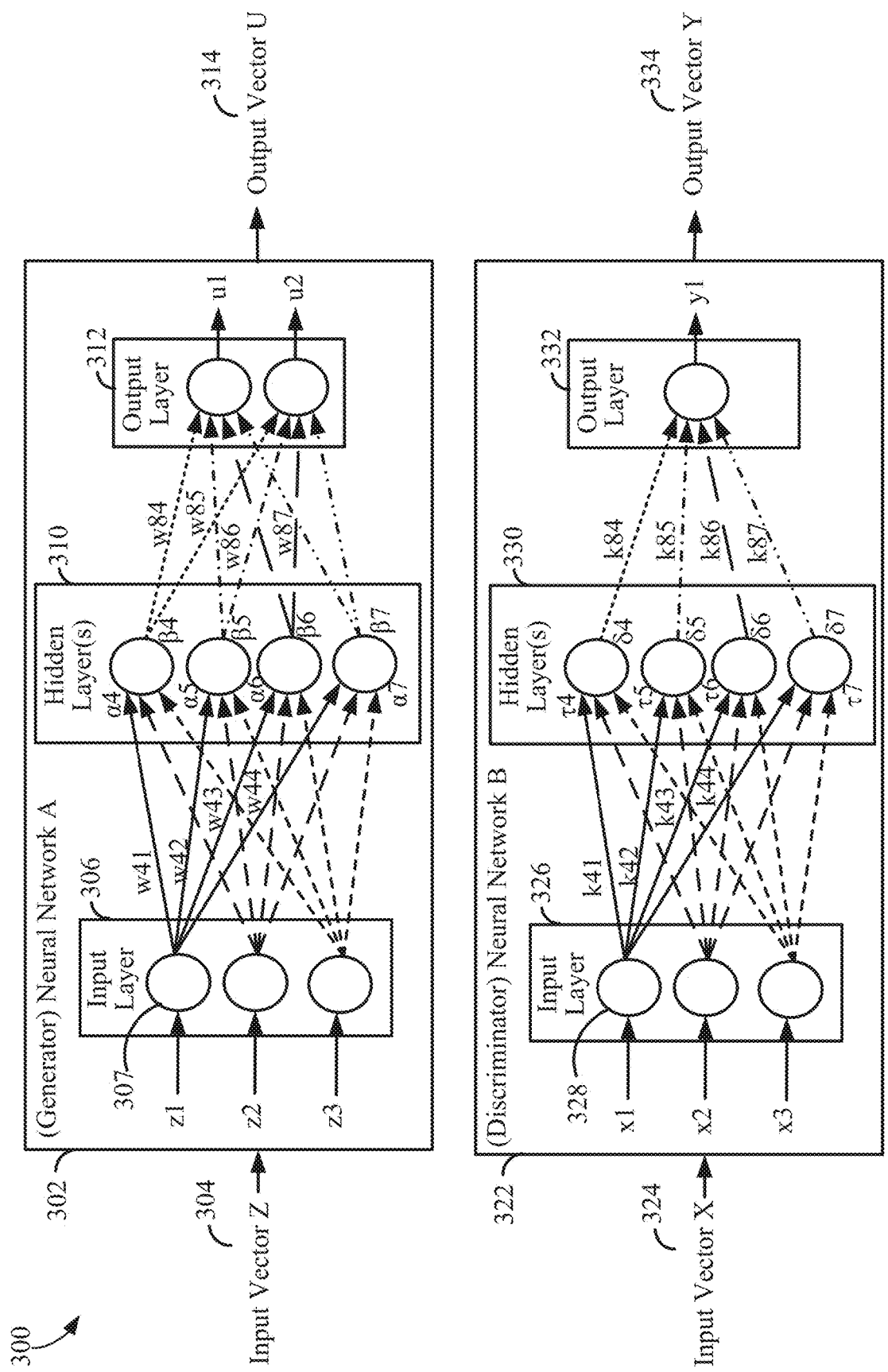
FIG. 3 illustrates general examples of how the generator network and discriminator network in FIG. 2 may be implemented using neural networks.

FIG. 3 illustrates general examples of how the generator network 202 and discriminator network 204 in FIG. 2 may be implemented using neural networks. For instance, the generator network 202 may be implemented by a generator neural network 302 that includes an input layer 306, one or more hidden/internal layers 310, and an output layer 312. Each layer may have a plurality of nodes 307. The nodes may be input nodes (receiving data from outside of the network), output nodes (yielding results), or hidden nodes (that modify the data from input to output). It should be understood that the number of nodes illustrated in the input layers 306, the hidden layers 310, and the output layer 312 are illustrative and various different numbers of nodes may be used in other implementations for each layer. Each node in a given layer is connected with a directed (one-way) connection to every other node in the next successive layer. Each node may have a time-varying real-valued activation. Each connection between nodes in different layers 306, 310, and 312 may have a modifiable real-valued weight (w) and/or parameters (e.g., ai and (3i). In this example, an input vector Z 304 may serve as an input to the generator neural network 302. The input vector Z 304 may comprise letters, numbers, symbols, words, and/or phrases. In one example, the generator neural network 302 may be configured, adapted, and/or trained to construct sentences that, combined, can be part of phishing emails. The resulting sentences (e.g., phishing emails) may be provided as an output vector U 314. Ultimately, the goal is for the generator neural network 302 to provide, within the output vector U 314, a representation of a generated phishing email.

In this example, the discriminator network 204 may be implemented by a discriminator neural network 322 that includes an input layer 336, one or more hidden/internal layers 330, and an output layer 332. Each layer may have a plurality of nodes 328. The nodes may be input nodes (receiving data from outside of the network), output nodes (yielding results), or hidden nodes (that modify the data from input to output). It should be understood that the number of nodes illustrated in the input layers 326, the hidden layers 330, and the output layer 332 are illustrative and various different numbers of nodes may be used in other implementations for each layer. Each node in a given layer is connected with a directed (one-way) connection to every other node in the next successive layer. Each node may have a time-varying real-valued activation. Each connection between nodes in different layers 326, 330, and 332 may have a modifiable real-valued weight (k) and/or parameters (e.g., τi and δi). In this example, an input vector X 324 may serve as an input to the discriminator network 322. The input vector X 324 may comprise, for instance, words, phrases, and/or sentences (e.g., real phishing emails and generated phishing emails from a generator neural network) that the discriminator network 322 may process to ascertain whether such data (e.g., phishing emails) appears real or fake/generated. The results are provided as an output vector Y 334. In one example, these results may be a value in the range of 0 (e.g., fake/generated phishing emails) to 1 (e.g., real phishing emails).

Referring again to FIG. 2, once the generator network 202 has been trained, a reinforcement learning network and/or algorithm 212 may adaptively learn user behavior and selects generated phishing mails based on the learned user behavior. That is, past user behavior may be collected in a database 214, including for instance: (a) user behavior in identifying past phishing emails (e.g., real and/or generated phishing mail), (b) phishing email features to which the user has been responsive or non-responsive, and/or (c) user recent web browsing history. This user behavior may be collected over time, and used to select the generated phishing mails (from the trained phishing mail generator 202) to send to the user 216. User actions, based on the selected generated phishing mail 218, may be sent back as feedback 220 to adapt the reinforcement learning network and/or algorithm 212.

In one example, the reinforcement learning network and/or algorithm 212 may be adapted to select and send a generated phishing email to the user 216. The user's action (if any), in response to receiving such selected phishing email 218, may be tracked using feedback 220 (e.g., tracking selection of a link, downloading of a file, or opening of a file). Over time, the reinforcement learning network and/or algorithm 212 may thus adjusts itself (based on this user feedback 220) to select some generated phishing email(s), from a pool of phishing emails generated by the generator network 202, that are most likely cause the user 216 to act (e.g., select a link or open a file attached to the email).

In one exemplary implementation, the reinforcement learning network and/or algorithm 212 may be implemented by a neural network, such as a bidirectional long short term memory (LSTM) recurrent neural network.

Figure 4:
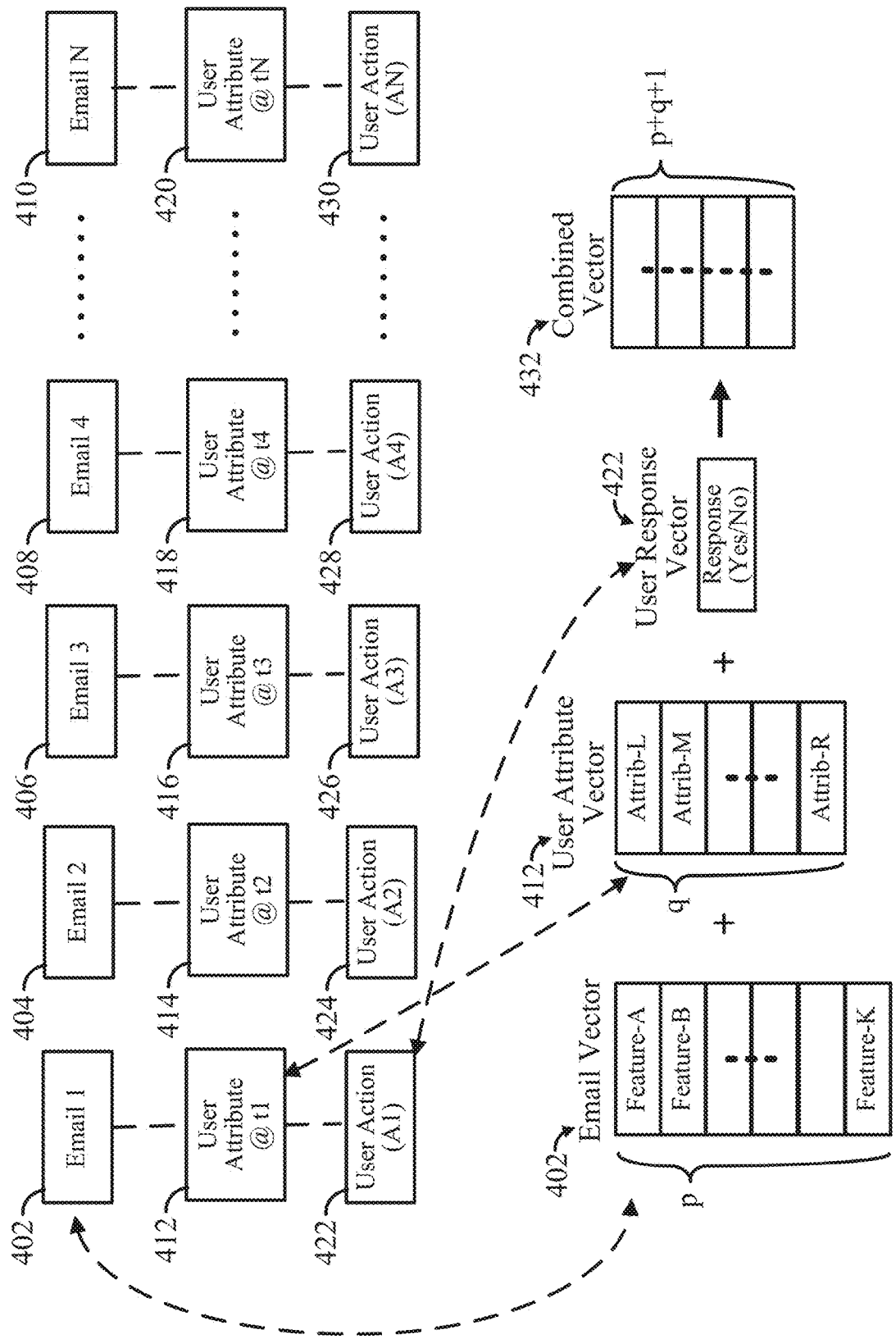
FIG. 4 illustrates an example of how phishing emails, user attributes, and user actions may be collected over time in order to provide reinforcement learning.

FIG. 4 illustrates an example of how past phishing emails, user attributes, and user actions may be collected over time and sent to a target user in order to implement reinforcement learning. This approach applies reinforcement learning to adaptively learn user behaviour and sends phishing mails accordingly. Generally, emails are sent from a pool of emails, and the target user's response (or lack of response) to such email serves as feedback to the system. In one example, the last or previous N emails (e.g., five, six, etc.) sent to the target user and corresponding user attributes and user action may serve to define a current state. Therefore, user feedback and action together provide the next state. The goal of the reinforcement learning network and/or algorithm 212 is to learn a policy based on accumulated user feedback or actions in the next n (e.g., 15) steps. Thus, this system adapts to changes in user behavior over time.

In this system, a plurality of phishing emails sent to the target user, the user attribute(s) at the time each of such phishing emails were sent, and the user response are used by the system to learn from and generate new phishing emails to send to the target user. For example, a plurality of past spam mails 402, 404, 406, 308, and 410, which were previously sent to the target user, may be selected by the phishing mail generator 202. Alternatively, the phishing email generator 202 may construct the electronic mails (e.g., sentences, phrases, links, attachments, etc.). Each email 402, 404, 406, 408, and 410 may have an associated user attribute 412, 414, 416, 418, and 420 corresponding to the time the associated email 402, 404, 406, 408, and 410 was sent. Examples of user attributes may include any information that may be available or discernible for a particular user, such as gender, age, computer usage history, browsing history, etc. Additionally, each email 402, 404, 406, 408, and 410, may also have an associated user action 422, 424, 426, 428, and 430 based on the previous feedback from the target user to that particular email. Examples of user actions may include whether the user opened a phishing email or not, whether the user clicked on a link in the phishing email, or whether the user opened a file appended to the email. Each email 402, 404, 406, 408, and 410, user attribute 412, 414, 416, 418, and 420, and user action 422, 424, 426, 428, and 430, may be represented in vector form. For instance, each email may be represented by a p length vector, each user attribute may be represented by a q length vector, and each user response as 1 length vector. The vectors associated with a single email may be concatenated into a single combined vector 432. The combined vectors 432 for each email may be provided to the reinforcement learning network and/or algorithm 212 (FIG. 2).

Figure 5:
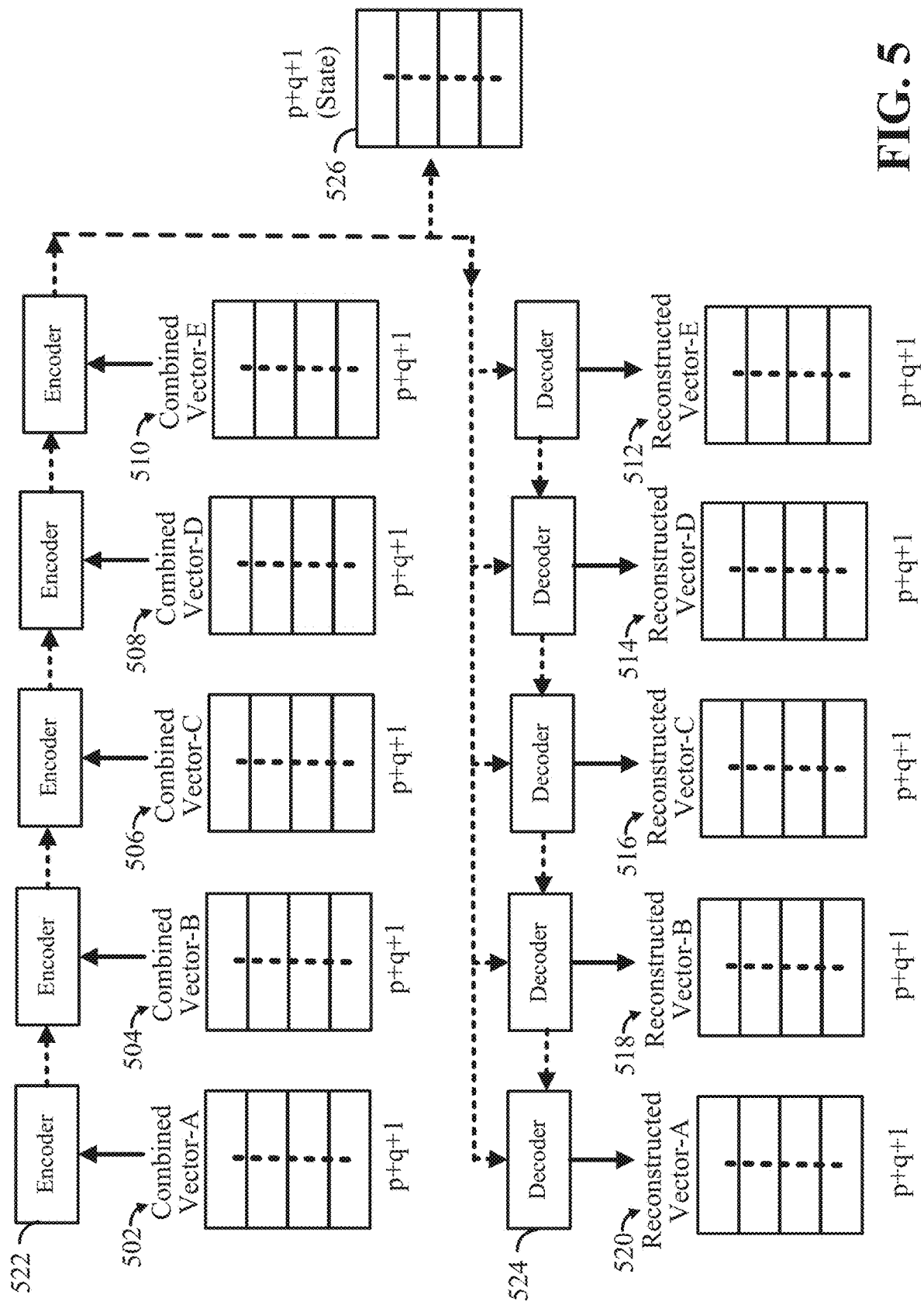
FIG. 5 illustrates an example of how a plurality of combined vectors, representative of past emails, user attributes, and user actions may serve to obtain a current state for a user.

FIG. 5 illustrates an example of how a plurality of combined vectors, representative of past emails, user attributes, and user actions may serve to obtain a current state for a user. In this example, a first recurrent neural network may serve as an encoder 522 of an input. An intermediate vector 526 may represent a final internal state produced by the encoder, and may contain information about the entire input sequence to help the decoder make accurate predictions. A second recurrent neural network may serve as the decoder 524 that provides an output. The plurality of combined vectors 502, 504, 506, 508, and 510 may include vectors representative of five emails, user attributes, and user actions. Each of the plurality of combined vectors 502, 504, 506, 508, and 510 may be encoded by the first recurrent neural network, e.g., a long short term memory (LSTM) auto encoder 522, which produces a single vector 526, e.g., intermediate vector, representative of the user state. In some implementations, the first recurrent neural network (e.g., LSTM) may take only one vector element at a time, so if the input sequence of combined vectors 502, 504, 506, 508, and 510 is of length m (e.g., five), then LSTM takes m time steps to read the entire input sequence of combined vectors. The second recurrent neural network decoder 524 serves to provide reconstructed vectors 512, 514, 516, 518, and 520, of the corresponding combined vectors 502, 504, 506, 508, and 510.

In one example, the phishing mail generator network 202 may serve to generate a pool of electronic mails, and each electronic mail is represented in vector form. The reinforcement learning network or algorithm 212 chooses one of the electronic mail vectors for each user based on the current state and policy.

Figure 6:
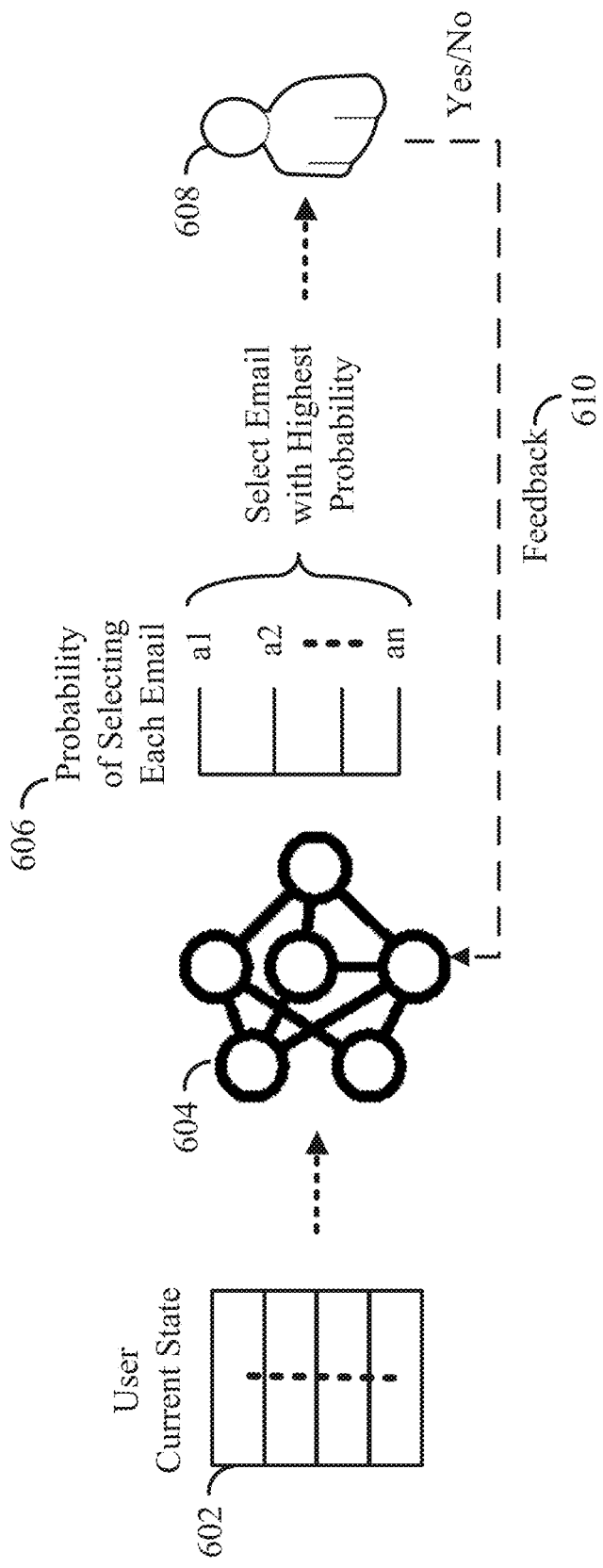
FIG. 6 illustrates an example of how a reinforcement learning network or algorithm may select an electronic mail from a pool of electronic mails based on a current state for a user and a policy seeking to maximize the likelihood that the user will respond to the selected electronic mail.

FIG. 6 illustrates an example of how a reinforcement learning network or algorithm may select an electronic mail from a pool of electronic mails based on a current state for a user and a policy seeking to maximize the likelihood that the user will respond to the selected electronic mail. A pool of electronic mails may be generated, e.g., as illustrated and described in FIGS. 2 and 3, and a current state 602 for a user may be established, e.g., as discussed in FIGS. 4 and 5.

The policy 606 of the reinforcement learning network or algorithm 604 is to select a particular electronic mail that has the highest probability of being selected by the particular user 608. The user feedback/action 610 may be used by the reinforcement learning network or algorithm 604 to adjust the current state for the user 608.

In one example, the reinforcement learning network or algorithm 212 may be based on a Deep Deterministic Policy Gradient (DDPG) algorithm. DDPG is an algorithm which concurrently learns a Q-function and a policy. It uses off-policy data and the Bellman equation to learn the Q-function, and uses the Q-function to learn the policy. Thus, DDPG can be referred to as a model-free off-policy actor-critic algorithm, combining Deterministic Policy Gradient (DPG) with Deep Q-Network (DQN). The original DQN works in a discrete space, and DDPG extends it to a continuous action space with the actor-critic framework while learning a deterministic policy. DDPG is used to train the reinforcement learning network or algorithm 212 to get an optimal policy.

Figure 7:
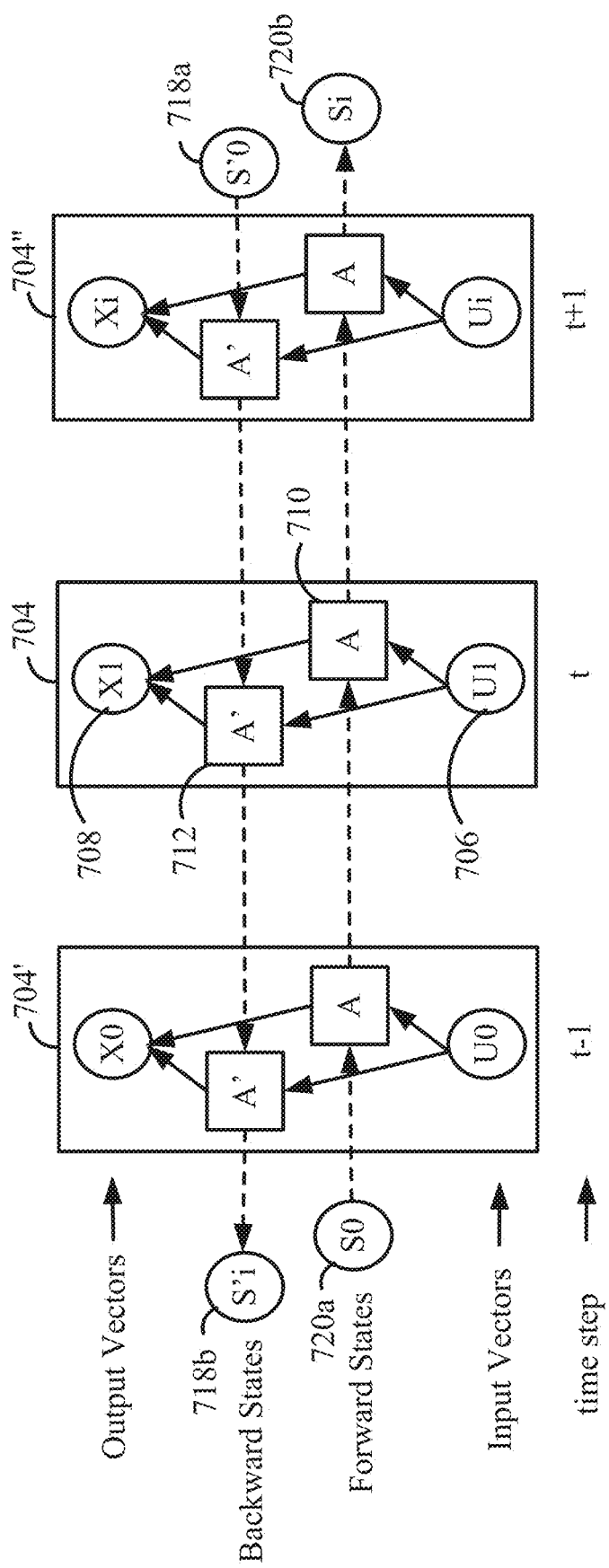
FIG. 7 is a block diagram illustrating one example of how the reinforcement learning network and/or algorithm FIG. 2 may be implemented using a bidirectional long short term memory (LSTM) recurrent neural networks (RNN).

FIG. 7 is a block diagram illustrating one example of how the reinforcement learning network and/or algorithm 212 of FIG. 2 may be implemented using a bidirectional long short term memory (LSTM) recurrent neural network (RNN). Like the neural network examples of FIG. 3, the reinforcement learning network and/or algorithm 212 may include an input layer, one or more hidden/internal layers, and an output layer, each layer may have a plurality of nodes, each node in a given layer is connected to other nodes in other layers, and each connection between nodes in different layers may have a modifiable real-valued weight and/or parameters.

A bidirectional long short term memory (LSTM) recurrent neural network is a special type of recurrent neural network (RNN) that is described in Graves, Generating Sequences with Recurrent Neural Networks, available at haps://arxiv.org/pdf/1308.0850.pdf. A directional recurrent neural network essentially puts two independent RNNs together, allowing the networks to have both backward and forward information about the sequence at every time step. A bidirectional LSTM RNN allows running inputs in two ways, one from past to future and one from future to past. The LSTM that runs backward preserves information from the future. Using the states in the hidden layers allows the bidirectional LSTM recurrent neural network to preserve information from both past and future. The bidirectional LSTM recurrent neural network learns bidirectional long-term dependencies between time steps of a sequence data (e.g., financial transactions). The length of memory for such neural networks may be defined by the number of previous time steps (e.g., states) maintained or remembered by the bidirectional LSTM RNN (e.g., within multiple nodes and/or layers of the network). For instance, the previous N generated phishing emails sent (e.g., previous N time periods) to the user 216 may be used to maintain and/or update states of the neural network.

As illustrated in FIG. 7, in a bidirectional RNN the outputs are based on accumulation of states in both past and future context. A similar bidirectional RNN may be implemented by the reinforcement learning network and/or algorithm 212. This diagram illustrates the same bidirectional RNN at three different times steps t−1, t, and t+1. At a given time t (or computational period), a bidirectional RNN 704 receives an input vector U1 706, which serves as input to a forward path neural network 710 and a backward path neural network 712 (e.g., accumulators of states), and provide an output vector X1 708. Similarly, at a previous time t−1 (or computational period), the bidirectional RNN 704' receives an input vector U0, which serves as input to the forward path neural network and the backward path neural network (e.g., accumulators of states), and provide an output vector X0. Likewise, at a subsequent time t+1 (or computational period), the bidirectional RNN 704" receives an input vector Ui, which serves as input to the forward path neural network and the backward path neural network (e.g., accumulators of states), and provide an output vector Xi. Forward path neural network states S0 to Si and backward path neural network states S'0 to S'i are accumulated at each time period. In one example, the input vector U may include user attributes (e.g., user browsing history, etc.), user actions (e.g., actions taken in response to generated phishing emails), and/or previously generated phishing emails. In this manner, the reinforcement learning network and/or algorithm 212 may be adjusted (e.g., adjustments to the neural network weights and/or parameters) as the user's actions to the generated phishing emails change. The goal of the reinforcement learning network and/or algorithm 212 is thus to develop a policy (e.g., network configuration, rules, etc.) that maximizes the possibility that the user will act upon a generated phishing email in the future.

In some implementations, the reinforcement learning network and/or algorithm 212 may be configured to select phishing emails from a pool of emails generated by the phishing mail generator network 202. The reinforcement learning network and/or algorithm 212 may then be adjusted based on user feedback, to improve its selection of phishing emails provided by the phishing mail generator network 202.

In other implementations, the reinforcement learning network and/or algorithm 212 may be configured to adjust or modify the phishing emails from the phishing mail generator network 202 to improve the likelihood that the user 216 will take action. For instance, the modifications may include adding particular links, files, etc., to further customize the phishing email generated by the generator network 202.

Figure 8:
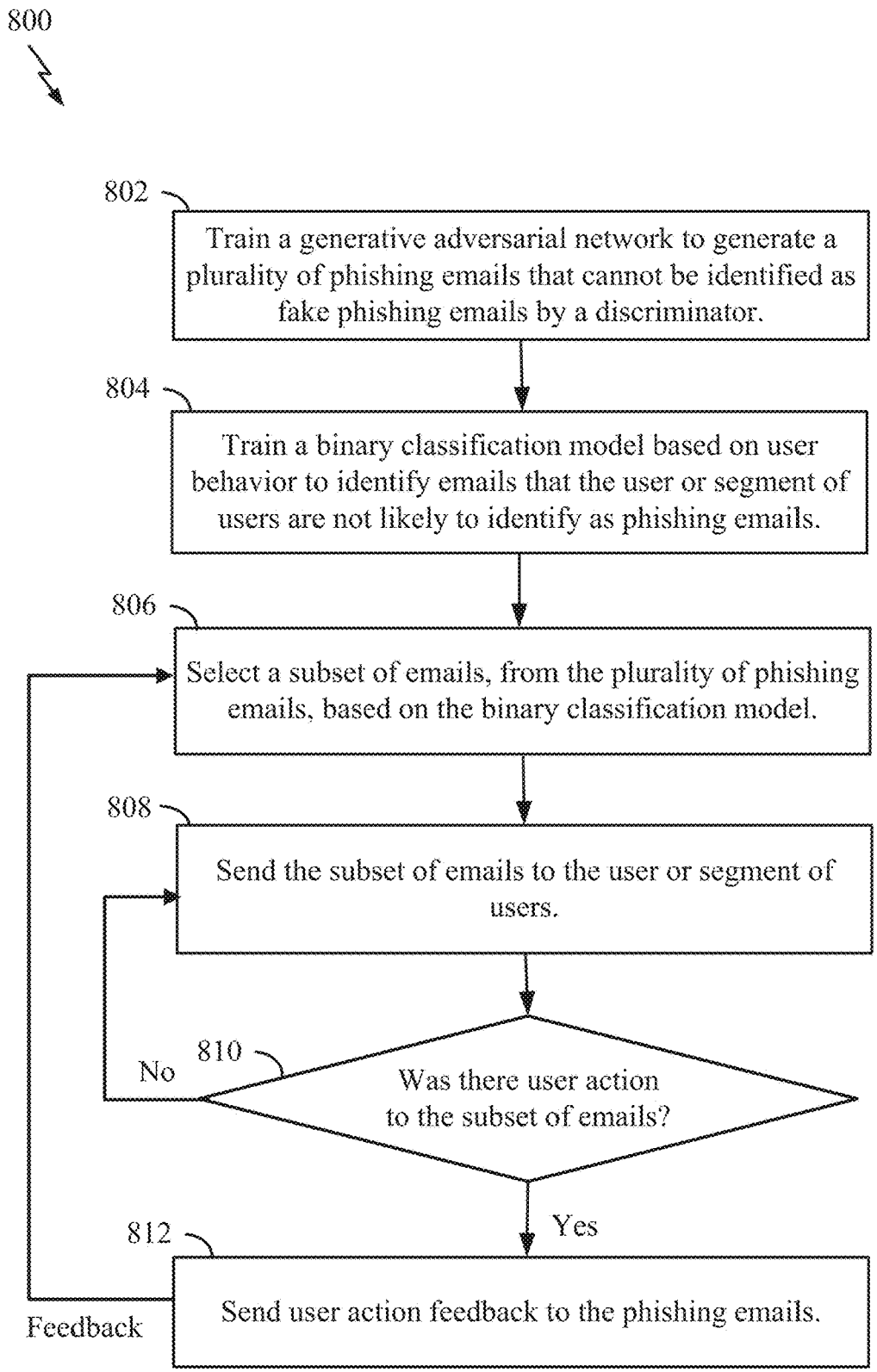
FIG. 8 illustrates an exemplary method that may be performed, at least in part, by a reinforcement learning network and/or algorithm.

FIG. 8 illustrates an exemplary method 800 that may be performed, at least in part, by a reinforcement learning network and/or algorithm.

A generative adversarial network (e.g., generator network 202 and discriminator network 204 in FIG. 2) may be trained to generate a plurality of phishing emails that cannot be identified as fake phishing emails by a discriminator 802. That is, the plurality of phishing emails may be generated by a generator neural network and the discriminator may be a discriminator neural network.

A binary classification model may be trained based on user behavior to identify emails that a user or segment of users are not likely to identify as phishing emails 804. That is, user behavior (e.g., browsing history, response to phishing emails, etc.) may be collected for a particular user or a segment of users. In one example, this user behavior may be used to generate a probability distribution over a set of words which are likely to trigger user action to phishing emails that use such words.

A subset of emails, from the plurality of phishing emails, may be selected based on the binary classification model 806. For instance, the plurality of (generated) phishing emails may be compared to the probability distribution over a set of words to identify the subset of phishing emails that have a high likelihood (e.g., above a defined threshold) of not being identified as a phishing email by the user or segment of users.

The subset of emails may be sent (e.g., one at a time, or several at a time) to the user or segment of users 808. For instance, generated phishing emails within the subset of emails may be sent randomly, sporadically, and/or according to a schedule to the user(s) to test whether the user is able to identify them as phishing emails.

If there is user action to the subset of emails 810 (e.g., user selects a link or opens an appended file), then feedback of the user action is sent 812 to train the binary classification model. Otherwise, additional identified emails may be sent to the user or segment of users. In this manner, reinforcement learning specific to a particular user or a segment of users may serve to train and/or adjust the binary classification model to improve it predictability (e.g., likelihood that a particular generated phishing email will be acted upon by a user).

Where a user takes action on a phishing email, the user may be provided or sent a notification that the email is a phishing email as a way to educate and/or train the user.

Figure 9:
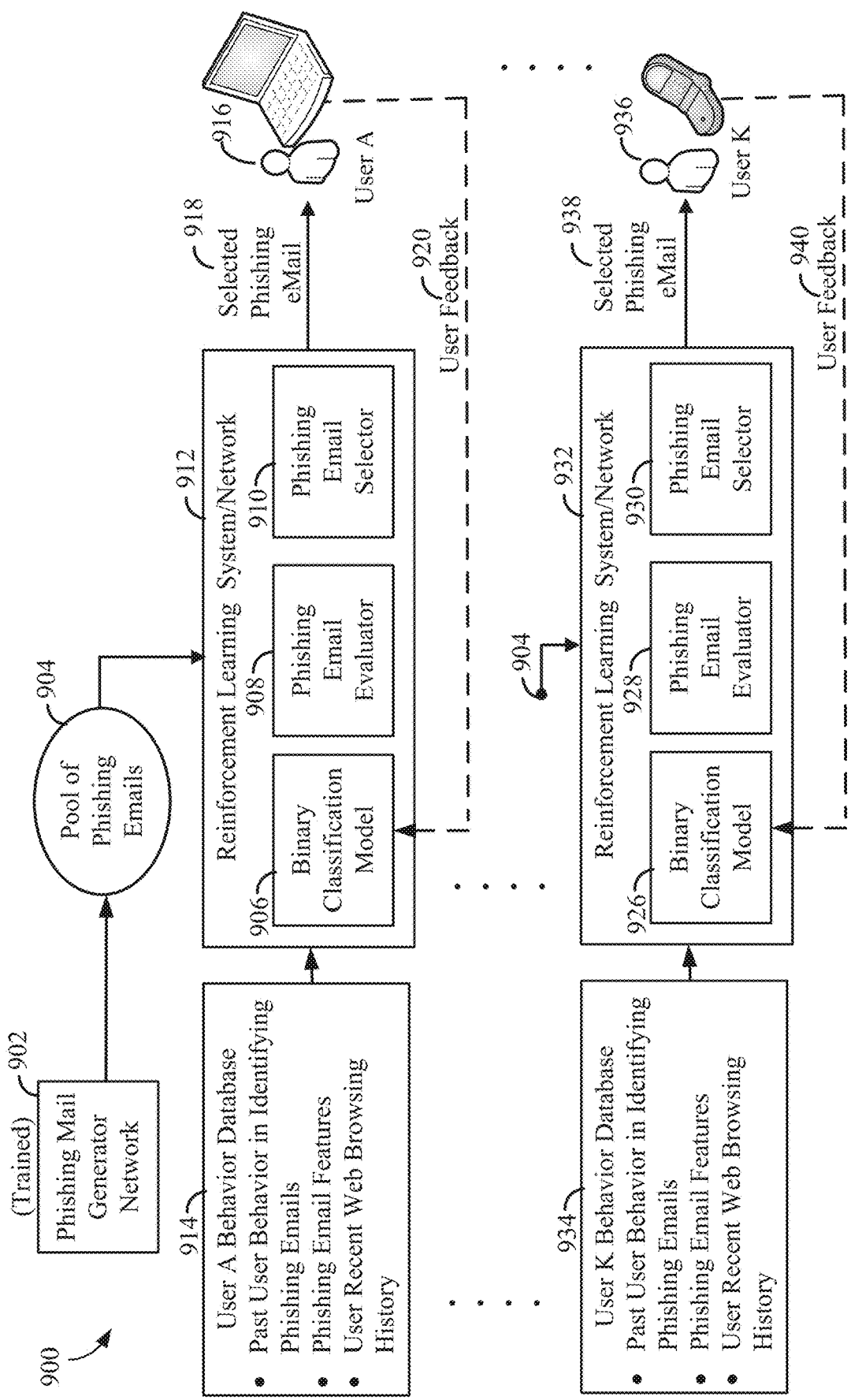
FIG. 9 is a block diagram illustrating a system for generating and sending phishing emails to multiple different users that adaptively adjusts to each user's behavior.

FIG. 9 is a block diagram illustrating a system 900 for generating and sending phishing emails to multiple different users that adaptively adjusts to each user's behavior. Like the system of FIG. 2, a phishing mail generator network 902 has been trained to generate phishing emails, and a pool of phishing emails 904 is obtained. For each user 916 and 936, a database of user behavior is also obtained 914 and 934, which tracks, for example, past user-specific behavior in identifying phishing emails (e.g., selecting or not selecting phishing emails), web browsing history, and successful phishing email features. This information is useful in selecting and/or modifying phishing emails to increase the likelihood the particular user will act upon the selected or modified phishing emails.

A reinforcement learning system or network 912 and 932 may be serve to select and/or modify one or more phishing emails from the pool of phishing emails for a specific user. To do this, in one example, the reinforcement learning system or network 912 and 932 may include a binary classification model 906 and 926, a phishing email evaluator 908 and 928, and a phishing email selector 910 and 930. The binary classification model 906 and 926 may use the user-specific behavior from the dataset 914 and 934 to identify keywords, email characteristics, etc., that are more likely to trigger an action by the particular user. The phishing email evaluator 908 and 928 may then rank or score each of the phishing email in the pool of phishing emails 904 based on the user-specific binary classification model 906 and 926. For example, for each user, a different subset of the phishing emails in the pool 904 may be ranked based on their likelihood to cause an action by a specific user (e.g., select a link or open a file the phishing email). For each user, the phishing email selector 910 and 930 may select only those phishing emails that have been ranked above a threshold, e.g., phishing emails having a high likelihood to cause an action by that user 916 and 936. Additionally, in one aspect, those selected emails may also be further modified, based on the specific user behavior, to increase the likelihood that the specific user will take an action.

The selected phishing emails 918 and 938 are sent to the users 916 and 936. If the user takes an action on the phishing emails, user feedback 920 and 940 is sent to binary classification model 906 and 926 to adaptively adjust the complexity of the model (e.g., policy and/or current user state) in order to improve the likelihood that the particular user will take an action on a future phishing email.

Note that if/when a user 916 or 936 acts upon a selected phishing email 918 or 938, that user may also be informed that they have fallen for a phishing email. In this manner, the user 916 or 936 may learn to identify phishing emails.

According to one aspect, the phishing email evaluator 908 and 928 and the phishing email selector 910 and 930 may be the same module, with only the binary classification model 906 and 926 being trained/adapted for each specific user or a segment/plurality of users. In this manner, a plurality of users may be trained by the system 900 at once.

Figure 10:
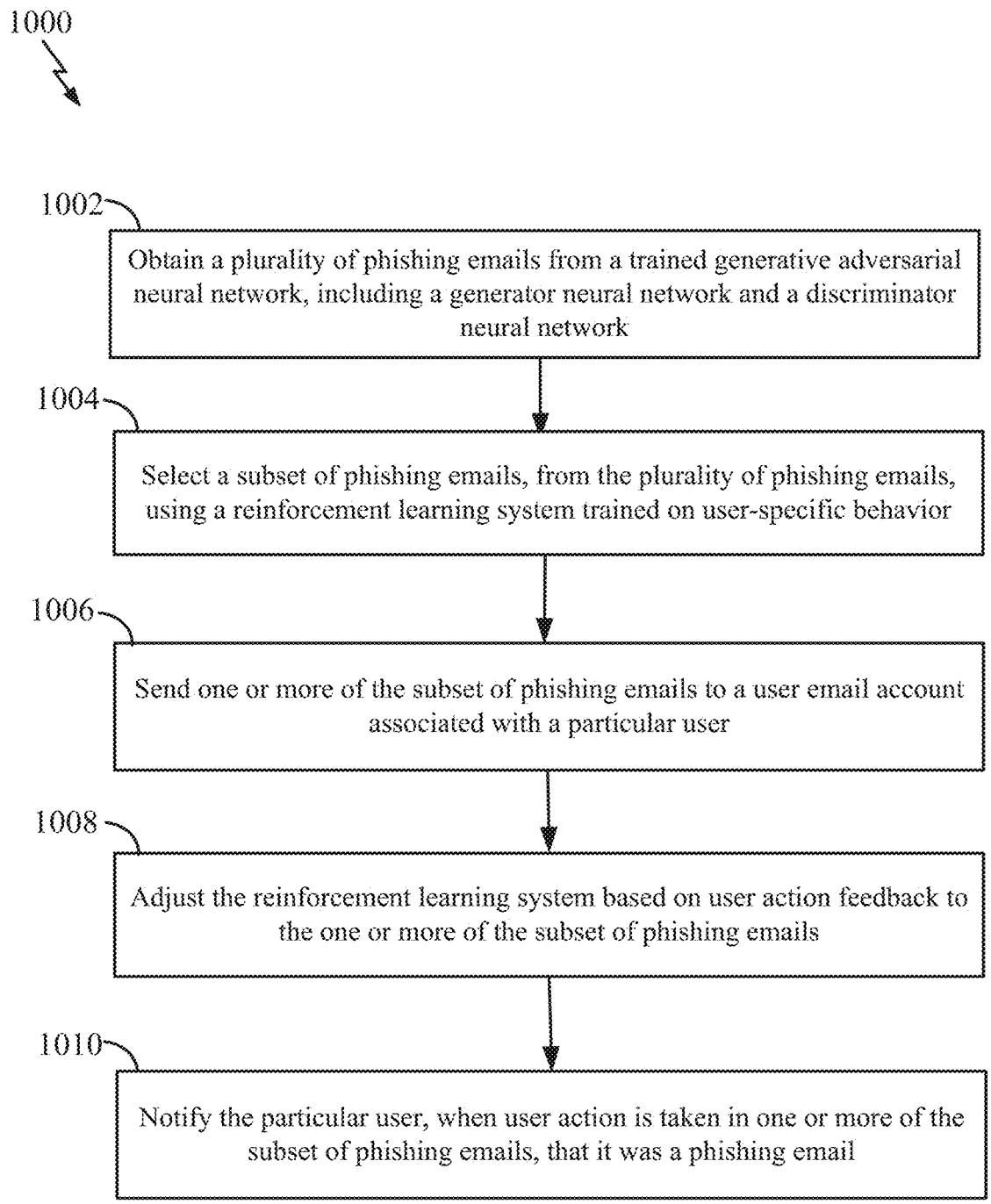
FIG. 10 is a method for generating phishing electronic mail (email) having adaptive complexity.

FIG. 10 is a method 1000 for generating phishing electronic mail (email) having adaptive complexity. This method may be used to train individuals, employees, and/or a group of individuals to identify phishing emails.

A plurality of phishing emails may be obtained from a trained generative adversarial neural network, including a generator neural network and a discriminator neural network 1002. According to one aspect, the trained generative adversarial neural network may be trained using real phishing emails and generated phishing emails until the discriminator neural network is unable to identify a threshold percentage of the generated phishing emails as fake phishing emails. The plurality of phishing emails may be generated by the generator neural network after the generative adversarial neural network is trained.

A subset of phishing emails is then selected, from the plurality of phishing emails, using a reinforcement learning system trained on user-specific behavior 1004. The subset of phishing emails may be selected based on the likelihood that the particular user will take action on one or more of the subset of phishing emails. In one example, the reinforcement learning system may be a bidirectional long short term memory (LSTM) recurrent neural network (RNN). The reinforcement learning system may have a retained memory of n previous time steps or phishing emails for the particular user. In various examples, the user-specific behavior may include at least one of: (a) web browsing history for the particular user, (b) past user behavior in identifying phishing, and/or (c) phishing email features to which the particular user has been responsive in the past.

One or more of the subset of phishing emails is sent to a user email account associated with a particular user 1006.

The reinforcement learning system may be adjusted based on user action feedback to the one or more of the subset of phishing emails 1008. After adjusting the reinforcement learning system, another subset of phishing emails may be selected, from the plurality of phishing emails, using the reinforcement learning system trained on user-specific behavior. One or more of the another subset of phishing emails may then be sent to the user email account associated with the particular user.

In various examples, the user action may include at least one of: (a) selecting a link in one or more of the subset of phishing emails sent to the user email account, (b) opening a file attached to the one or more of the subset of phishing emails sent to the user email account, and/or (c) replying to one or more of the subset of phishing emails sent to the user email account.

Additionally, when user action is taken in one or more of the subset of phishing emails, the particular user may be notified that it was a phishing email 1010.

This method may be incorporated as part of a training system for a plurality of individuals or users. The reinforcement learning system may thus select another subset of phishing emails, from the plurality of phishing emails, using the reinforcement learning system trained on a different user-specific behavior. One or more of the another subset of phishing emails may be sent to another user email account associated with another user. The reinforcement learning system (or a portion thereof) may be adjusted based on user action feedback to the one or more of the another subset of phishing emails. The reinforcement learning system may be configured to maintain distinct classification models and/or neural networks for each user in order to serve/train a plurality of users.

Figure 11:
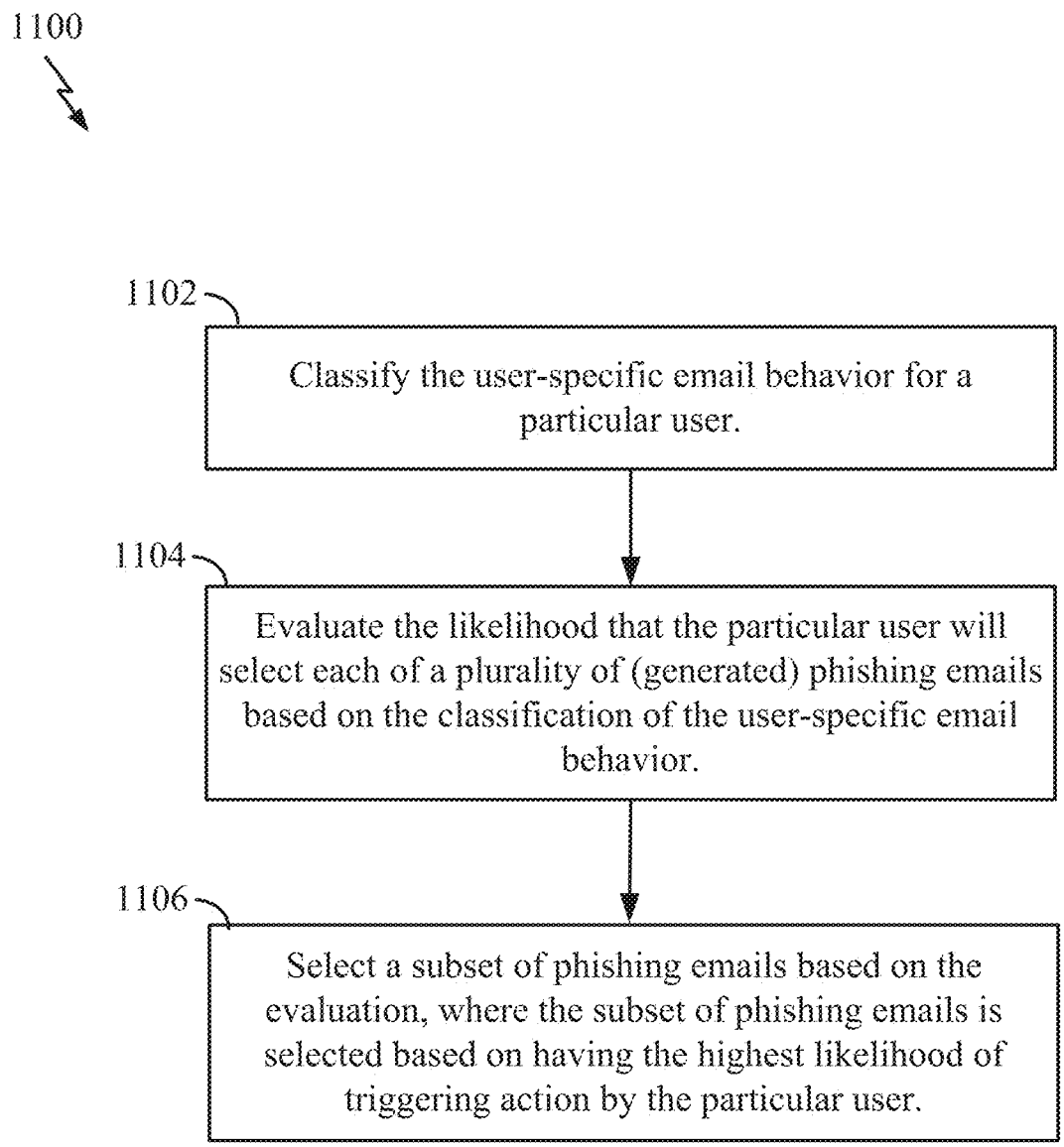
FIG. 11 illustrates one example of a method that may be implemented by a reinforcement learning system based on adaptive complexity.

FIG. 11 illustrates one example of a method 1100 that may be implemented by a reinforcement learning system based on adaptive complexity. User-specific behavior may be classified for a particular user 1102. A likelihood or probability that the particular user will select each of the plurality of phishing emails may be evaluated based on the classification of the user-specific behavior 1104. A subset of phishing emails may then be selected based on the evaluation, where the subset of phishing emails is selected based on having the highest likelihood of triggering action by the particular user 1106.

Figure 12:
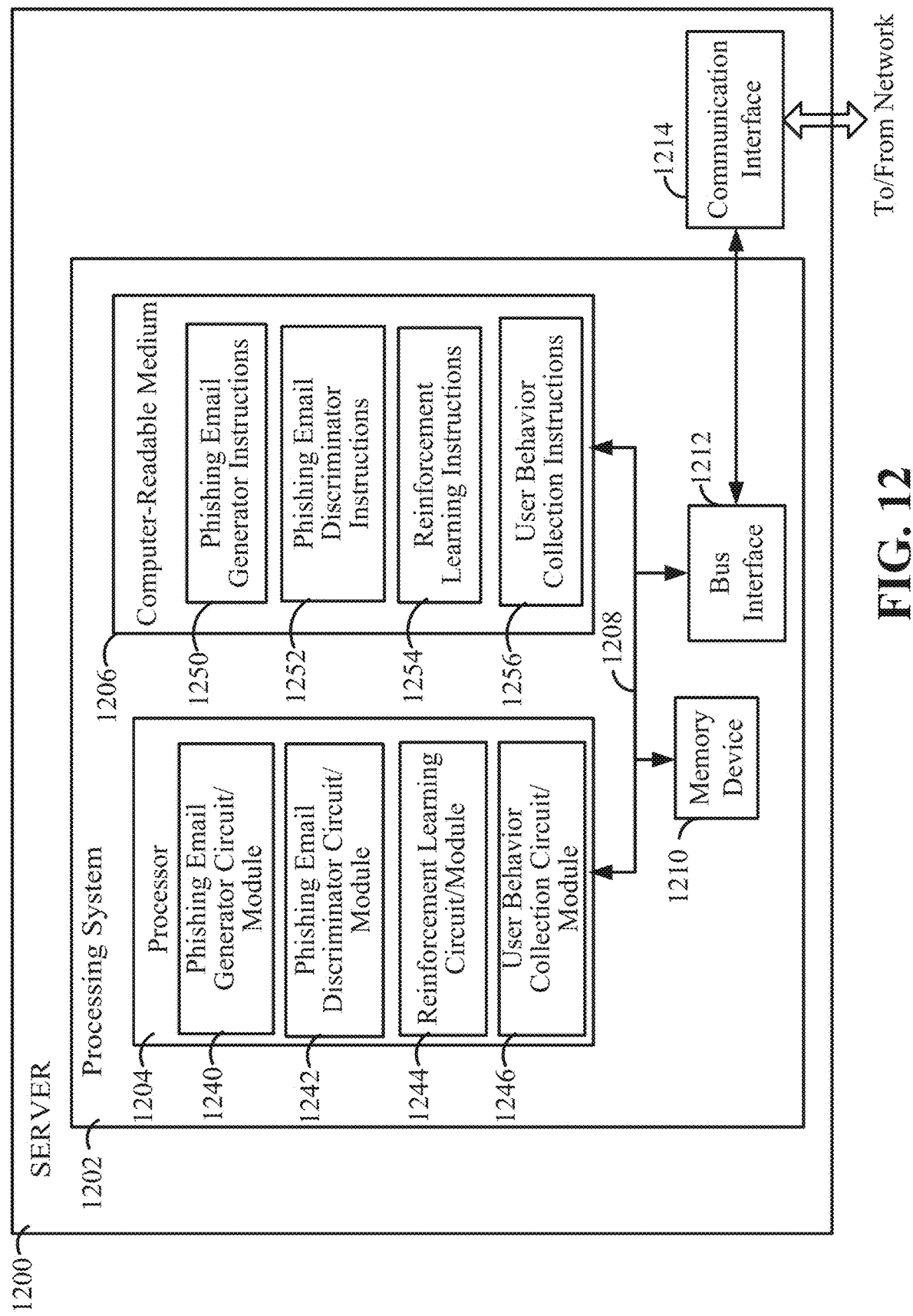
FIG. 12 is a block diagram illustrating an exemplary server that may be configured to generate phishing electronic mail (email) having adaptive complexity.

FIG. 12 is a block diagram illustrating an exemplary server 1200 that may be configured to generate phishing electronic mail (email) having adaptive complexity. The server 1200 may be configured to implement one or more of the steps or functions illustrated in FIGS. 1-11.

The server 1200 may include a processing system 1202 that may be implemented with a bus architecture, represented generally by the bus 1208. The bus 1208 may include any number of interconnecting buses and bridges depending on the specific application of the processing system 1202 and the overall design constraints. The bus 1208 communicatively couples together various circuits including one or more processors (represented generally by the processor 1204), a computer-readable (or processor-readable) storage media (represented generally by the computer-readable storage medium 1206), and a memory device 1210. The bus 1208 may also link various other circuits such as timing sources, peripherals, voltage regulators, and power management circuits, which are well known in the art, and therefore, will not be described any further. A bus interface 1212 provides an interface between the bus 1208 and a communication interface 1214. The communication interface 1214 provides a means for communicating with various other apparatus over a transmission medium, such as a network. In this manner, the transaction server 1200 may communicate with one or more networks, other servers and/or devices to receive and/or send electronic mails.

The processor 1204 in the processing system 1202 may be configured to execute software. Such software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable storage medium 1206. The processor-readable storage medium 1206 may be a non-transitory processor-readable storage medium.

In some aspects of the disclosure, the processor 1204 may include a phishing email generator circuit or module 1240 configured for various functions, including, for example, generating phishing emails using a neural network. For example, the phishing email generator circuit or module 1240 may be configured to implement one or more of the functions described in relation to obtaining or generating phishing emails in FIG. 2 (block 202), FIG. 3 (block 302), and FIG. 9, block 902.

In some aspects of the disclosure, the processor 1204 may also include a phishing email discriminator circuit or module 1242 configured for various functions, including, for example, evaluating whether an email is a real or fake phishing email. For example, the phishing email discriminator circuit or module 1242 may be configured to implement one or more of the functions described in relation with ascertaining, using a neural network, whether an email is a real or fake phishing email in FIG. 2 (block 204), and FIG. 3 (block 322). The phishing email generator circuit or module 1240 and the phishing email discriminator circuit or module 1242 may operate as a generative adversarial network as described in FIG. 2.

In some aspects of the disclosure, the processor 1204 may also include a reinforcement learning circuit or module 1244 configured for various functions, including, for example, implementing a bidirectional long short term memory (LSTM) recurrent neural networks (RNN) that adaptively adjusts selection of generated phishing emails based on user history and feedback. For example, the reinforcement learning circuit or module 1244 may be configured to implement one or more of the functions described in relation with selection of generated phishing emails based on reinforcement learning in FIG. 2 (block 212), FIGS. 4, 5, 6, 7, 8, 9, 10 and 11.

In some aspects of the disclosure, the processor 1204 may also include a user behavior collection circuit or module 1246 configured for various functions, including, for example, obtaining a history of user behavior and/or feedback of user actions. For example, the user behavior collection circuit or module 1246 may be configured to implement one or more of the functions described in relation to obtaining user behavior (relative to web browsing history and/or email selection) in FIG. 2 (block 214) and FIG. 9 (blocks 914 and 934).

The computer-readable medium 1206 may include instructions for generating and adaptively modifying generation of phishing emails. By way of example, the non-transitory computer-readable storage medium 1206 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. In various implementations, the computer-readable storage medium 1206 may reside in the processing system 1202, external to the processing system 1202, or distributed across multiple entities including the processing system 1202. The computer-readable storage medium 1206 may be embodied in a computer program product. By way of example, a computer program product may include a computer-readable (or processor-readable) storage medium in packaging materials.

In some aspects of the disclosure, the processor-readable storage medium 1206 may include phishing email generator software/instructions 1250 configured for various functions, including, for example, generating (e.g., obtaining, selecting, and/or retrieving) phishing emails. For example, the phishing email generator software/instructions 1250 may be configured to implement one or more of the functions described in relation to obtaining generating phishing emails in FIGS. 2 and 9.

In some aspects of the disclosure, the processor-readable storage medium 1206 may further include phishing email discriminator software/instructions 1252 configured for various functions, including, for example, discerning real phishing emails from fake/generated phishing emails. For example, the phishing email discriminator software/instructions 1052 may be configured to implement one or more of the functions described in relation with evaluating phishing emails in FIGS. 2 and 9.

In some aspects of the disclosure, the processor-readable storage medium 1206 may also include reinforcement learning software/instructions 1254 configured for various functions, including, for example, implementing a bidirectional long short term memory (LSTM) recurrent neural networks (RNN) that adaptively adjusts selection of generated phishing emails based on user history and feedback. For example, the reinforcement learning software/instructions 1254 may be configured to implement one or more of the functions described in relation with selecting generated phishing emails and adaptively adjusting such selection criteria in FIGS. 2, 6, 7, 10, and 11.

In some aspects of the disclosure, the processor-readable storage medium 1206 may also include user behavior collection software/instructions 1256 configured for various functions, including, for example, collecting user-specific behavior relative to web browsing and/or email selection. For example, the user behavior collection software/instructions 1056 may be configured to implement one or more of the functions described in relation with collecting user behavior information in FIGS. 2, 9, 10 and 11.

Within the present disclosure, the words "exemplary" or "example" are used to mean "serving as an instance or illustration." Any implementation or aspect described herein as "exemplary" or "an example" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another, even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for generating phishing electronic mail (email) with adaptive complexity, comprising:
    obtaining a plurality of phishing emails from a trained generative adversarial neural network, the trained generative adversarial neural network including a generator neural network and a discriminator neural network;
    selecting a subset of phishing emails, from the plurality of phishing emails, using a reinforcement learning system trained on user-specific behavior based on likelihood that a particular user will take action on one or more of the subset of phishing emails;
    sending one or more of the subset of phishing emails to a user email account associated with the particular user; and
    adjusting the reinforcement learning system to select one or more phishing emails that are likely to cause the particular user to take action, based on user action feedback to the one or more of the subset of phishing emails.

2. The method of claim 1, wherein the reinforcement learning system is a bidirectional long short term memory (LSTM) recurrent neural network (RNN).

3. The method of claim 2, wherein the reinforcement learning system has a retained memory of n previous time steps or phishing emails for the particular user.

4. The method of claim 2, wherein at least each of the subset of phishing emails, the user-specific behavior, and the user action feedback are represented as a vector and a user state is defined based on a plurality of n previous phishing emails for the particular user.

5. The method of claim 2, wherein the reinforcement learning system implements a Deep Deterministic Policy Gradient (DDPG) algorithm to train the reinforcement learning system.

6. The method of claim 2, wherein the user-specific behavior includes at least one of:
    (a) web browsing history for the particular user,
    (b) past user behavior in identifying phishing, and
    (c) phishing email features to which the particular user has been responsive in the past.

7. The method of claim 1, wherein the trained generative adversarial neural network is trained using real phishing emails and generated phishing emails until the discriminator neural network is unable to identify a threshold percentage of the generated phishing emails as fake phishing emails.

8. The method of claim 1, wherein the plurality of phishing emails are generated by the generator neural network after the generative adversarial neural network is trained.

9. The method of claim 1, wherein the subset of phishing emails is selected based on the likelihood that the particular user will take action on one or more of the subset of phishing emails.

10. The method of claim 1, wherein user action includes at least one of:
   (a) selecting a link in one or more of the subset of phishing emails sent to the user email account,
   (b) opening a file attached to the one or more of the subset of phishing emails sent to the user email account, and
   (c) replying to one or more of the subset of phishing emails sent to the user email account.

11. The method of claim 1, wherein the reinforcement learning system is configured to:
   classify the user-specific behavior,
   evaluate the likelihood that the particular user will select each of the plurality of phishing emails based on the classification of the user-specific behavior, and
   select the subset of phishing emails based on the evaluation, where the subset of phishing emails is selected based on having the highest likelihood of triggering action by the particular user.

12. The method of claim 1, further comprising:
   notifying the particular user, when user action is taken in one or more of the subset of phishing emails, that it was a phishing email.

13. The method of claim 1, wherein after adjusting the reinforcement learning system, the method further comprising:
   selecting another subset of phishing emails, from the plurality of phishing emails, using the reinforcement learning system trained on user-specific behavior; and
   sending one or more of the another subset of phishing emails to the user email account associated with the particular user.

14. The method of claim 1, further comprising:
   selecting another subset of phishing emails, from the plurality of phishing emails, using the reinforcement learning system trained on a different user-specific behavior;
   sending one or more of the another subset of phishing emails to another user email account associated with another user; and
   adjusting the reinforcement learning system based on user action feedback to the one or more of the another subset of phishing emails.

15. A non-transitory computer-readable storage medium having instructions thereon, wherein the instructions, when executed by a processing circuit, cause the processing circuit to:
   obtain a plurality of phishing emails from a trained generative adversarial neural network, the trained generative adversarial neural network including a generator neural network and a discriminator neural network;
   select a subset of phishing emails, from the plurality of phishing emails, using a reinforcement learning system trained on user-specific behavior based on likelihood that a particular user will take action on one or more of the subset of phishing emails;
   send one or more of the subset of phishing emails to a user email account associated with the particular user; and
   adjust the reinforcement learning system to select one or more phishing emails that are likely to cause the particular user to take action, based on user action feedback to the one or more of the subset of phishing emails.

16. The non-transitory computer-readable storage medium of claim 15, wherein the reinforcement learning system is a bidirectional long short term memory (LSTM) recurrent neural network (RNN).

17. The non-transitory computer-readable storage medium of claim 15, wherein the reinforcement learning system is configured to:
   classify the user-specific behavior,
   evaluate the likelihood that the particular user will select each of the plurality of phishing emails based on the classification of the user-specific behavior, and
   select the subset of phishing emails based on the evaluation, where the subset of phishing emails is selected based on having the highest likelihood of triggering action by the particular user.

18. The non-transitory computer-readable storage medium of claim 15, having further instructions thereon, which when executed by a processing circuit, cause the processing circuit to:
   notify the particular user, when user action is taken in one or more of the subset of phishing emails, that it was a phishing email.

19. A server, comprising:
   at least one processor;
   a communication interface communicatively coupled to the at least one processor; and
   a memory communicatively coupled to the at least one processor, wherein the at least one processor is configured to:
   obtain a plurality of phishing emails from a trained generative adversarial neural network, the trained generative adversarial neural network including a generator neural network and a discriminator neural network;
   select a subset of phishing emails, from the plurality of phishing emails, using a reinforcement learning system trained on user-specific behavior based on likelihood that a particular user will take action on one or more of the subset of phishing emails;
   send one or more of the subset of phishing emails to a user email account associated with the particular user; and
   adjust the reinforcement learning system to select one or more phishing emails that are likely to cause the particular user to take action, based on user action feedback to the one or more of the subset of phishing emails.

20. The server of claim 19, wherein the at least one processor is further configured to:
   notify the particular user, when user action is taken in one or more of the subset of phishing emails, that it was a phishing email.

* * * * *